Figure 1:
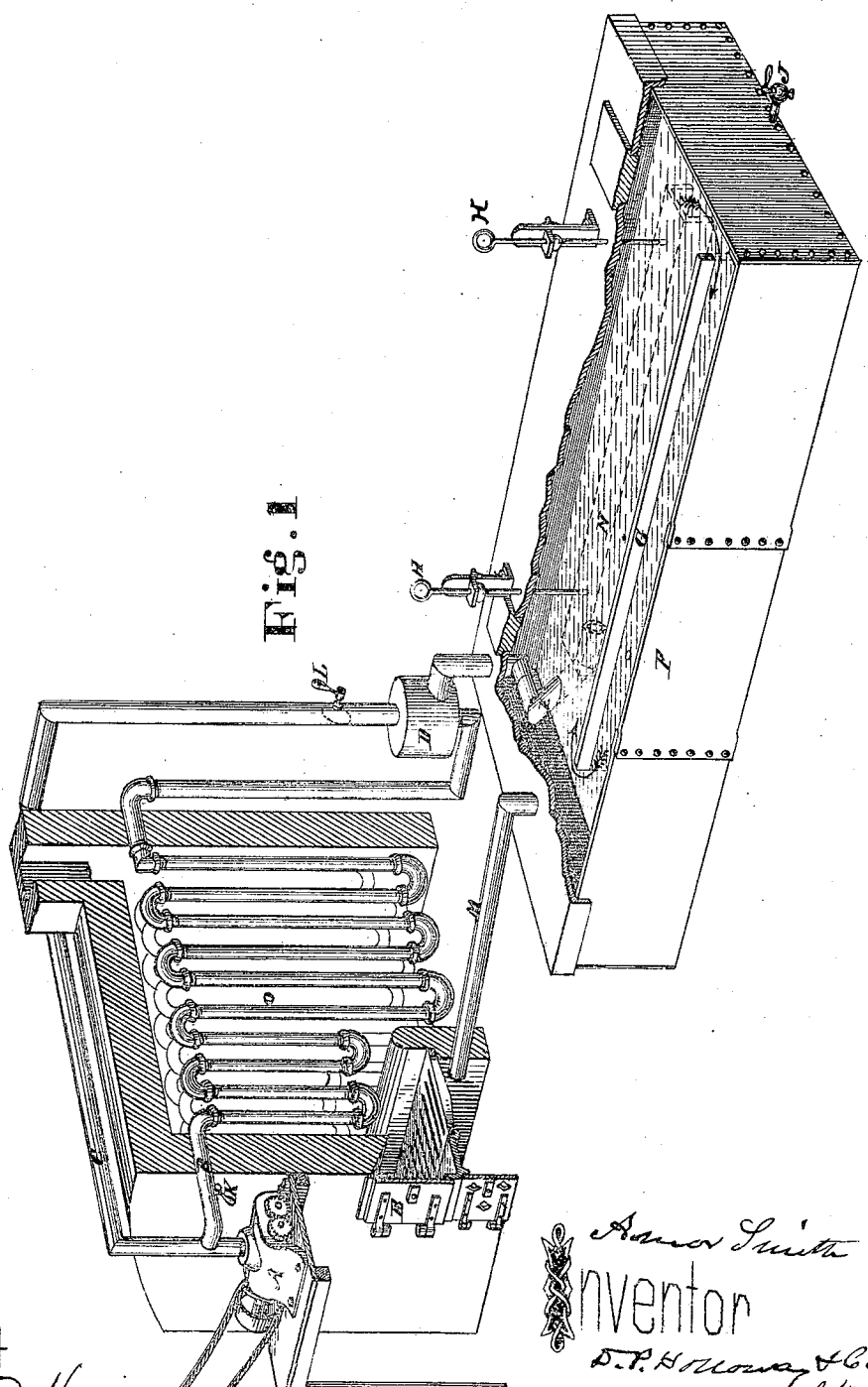

A. SMITH.
Apparatus for Drying and Cooling Tallow or Lard.
No. 142,744. Patented September 9, 1873.

UNITED STATES PATENT OFFICE.

AMOR SMITH, OF CINCINNATI, OHIO.

IMPROVEMENT IN APPARATUS FOR DRYING AND COOLING TALLOW OR LARD.

Specification forming part of Letters Patent No. 142,744, dated September 9, 1873; application filed June 18, 1873.

*To all whom it may concern:*

Be it known that I, AMOR SMITH, of Cincinnati, in the county of Hamilton and State of Ohio, have invented a new and useful Apparatus for Drying and Cooling Tallow or Lard; and I do hereby declare that the following is a full, clear, and exact description of the same, reference being had to the annexed drawings making part of this specification.

This apparatus is intended to be applied to the purpose of drying and cooling, preparatory for packing, lard or tallow which has been rendered by wet steam.

In the annexed drawings, A is a fan or other form of blast for inducing a blast of air, which is carried either through the pipe B or the pipe C to the drum D, and thence into the covered tank F. The pipe C may be opened or closed by a stop-cock, L, and the pipe B by a similar cock, K. The pipe I leads from the drum D into the covered tank F. It is so constructed that its point of discharge may be adjusted higher or lower, according to the quantity of material in the tank. The pipe I passes under the inverted trough N, which may be raised or lowered by means of the rods H H, from which it is suspended. This trough is intended to distribute the action of the air through the material operated upon. A partition, G, is raised partly across the tank, so as to leave open spaces at each end for the purpose of promoting a uniform circulation and consequent temperature through the fluid mass while under subjection to treatment in either drying or cooling. A pipe, M, may be used or not, at will, for drawing off the fumes.

The apparatus is operated in the following manner: The melted material, which has been rendered by wet steam, is drawn from the digester into the tank F. The cock L is closed and the cock K opened. The air forced through the pipe B should, in passing through the furnace, be heated to a temperature of from 225° to 275° Fahrenheit, and be forced through the melted material until all the water is evaporated therefrom. When this has been accomplished the cock L is to be opened and the cock K closed, and a current of cold air forced through the melted material until its temperature is reduced uniformly to such an extent as to give it a viscid creamy consistency throughout, when it should be drawn off through the escape-pipe J into the vessels in which it is to be packed.

I am aware that, in divers machines, provision has been made for heating or drying, and then cooling, the lard. Among these cases are the patents of H. S. Lewis, G. B. Turrell, Camp and Reid, Wm. S. Wilcox, and Volney E. Rusco.

My invention is distinguished from all others in this, that a set of pipes are introduced into a tank containing the melted lard, and through which a stream of hot air is first passed through the material treated, and then a current of cold air is introduced in like manner.

What I claim as my invention, and desire to secure by Letters Patent, is—

1. An apparatus for drying and cooling tallow or lard, combining in its construction a pressure blast, a pipe for cold air, and another passing through a heating-furnace, and a tank for containing the melted material, into which a blast of hot air and of cold air may be successively introduced, substantially as set forth.

2. In combination with the tank F, and hot and cold air pipes B and C, the adjustable pipe I, and distributing-trough N, adjustable in manner substantially as set forth.

AMOR SMITH.

Witnesses:
JOHN W. CALDWELL,
LEANDER SMITH.